US012335689B2

(12) United States Patent
Mattmüller et al.

(10) Patent No.: US 12,335,689 B2
(45) Date of Patent: Jun. 17, 2025

(54) COMPUTING DEVICES AND METHODS FOR PROCESSING AUDIO CONTENT FOR TRANSMISSION TO A HEARING DEVICE

(71) Applicant: SONOVA AG, Staefa (CH)

(72) Inventors: Jan Mattmüller, Effretikon (CH); Peter Haldi, Zurich (CH); Markus Hofbauer, Hombrechtikon (CH)

(73) Assignee: Sonova AG, Staefa (CH)

( * ) Notice: Subject to any disclaimer, the term of this patent is extended or adjusted under 35 U.S.C. 154(b) by 371 days.

(21) Appl. No.: 18/080,286

(22) Filed: Dec. 13, 2022

(65) Prior Publication Data

US 2024/0196139 A1 Jun. 13, 2024

(51) Int. Cl.
*H04R 25/00* (2006.01)
*G10L 21/028* (2013.01)

(52) U.S. Cl.
CPC .......... *H04R 25/507* (2013.01); *G10L 21/028* (2013.01); *H04R 25/554* (2013.01); *H04R 2225/43* (2013.01)

(58) Field of Classification Search
CPC .............. G10L 21/028; G10L 21/0364; H04R 2225/43; H04R 25/507; H04R 25/554; H04L 1/0017; H04L 1/0028; H04L 1/0071; H04L 25/14; H04L 27/2602
USPC .......................................................... 381/315
See application file for complete search history.

(56) References Cited

U.S. PATENT DOCUMENTS

| | | | | |
|---|---|---|---|---|
| 2015/0030165 | A1 | 1/2015 | Risberg et al. | |
| 2019/0222943 | A1 | 7/2019 | Andersen et al. | |
| 2022/0093118 | A1 | 3/2022 | Diehl et al. | |
| 2022/0095061 | A1 | 3/2022 | Diehl et al. | |
| 2023/0209282 | A1 * | 6/2023 | Birnbaum ............ | H04R 25/554 381/317 |

FOREIGN PATENT DOCUMENTS

| | | | |
|---|---|---|---|
| EP | 1531650 | A2 | 5/2005 |

* cited by examiner

*Primary Examiner* — Phylesha Dabney
(74) *Attorney, Agent, or Firm* — ALG Intellectual Property, LLC

(57) ABSTRACT

An exemplary computing device includes a memory storing instructions; and a processor communicatively coupled to the memory and configured to execute the instructions to perform a process. The process may comprise identifying a hearing profile of a user of a hearing device; providing audio content as an input to a machine learning model; generating modified audio content by adjusting a characteristic of the audio content based on an output of the machine learning model and the hearing profile of the user of the hearing device; and transmitting the modified audio content to the hearing device.

17 Claims, 8 Drawing Sheets

COMPUTING DEVICES AND METHODS FOR PROCESSING AUDIO CONTENT FOR TRANSMISSION TO A HEARING DEVICE

BACKGROUND INFORMATION

Hearing devices (e.g., hearing aids) are used to improve the hearing capability and/or communication capability of users of the hearing devices. Such hearing devices are configured to process a received input sound signal (e.g., ambient sound) and provide the processed input sound signal to the user (e.g., by way of a receiver (e.g., a speaker) placed in the user's ear canal or at any other suitable location).

Users of hearing devices typically have difficulty understanding certain types of sound included in audio content such as television ("TV") programs. For example, dialogue in TV programs is typically difficult for users of hearing devices to understand due to the signal to noise ratio in an audio signal of TV programs. Increasing the loudness of the sound and/or adding high frequency gain may help improve perceptibility for hearing device users in some cases. However, such solutions typically provide less benefit in a TV program use case than a hearing device may provide with face-to-face communications in a noisy environment. For example, with face-to-face communications in a noisy environment, a hearing device may use beamforming algorithms to suppress noise from the sides and/or behind the user to improve the signal to noise ratio of the sound (e.g., conversation) in front of the user. However, such a solution is not possible in situations where a user of a hearing device wants to experience audio content (e.g., TV programs, movies, etc.) transmitted wirelessly (e.g., by way of a Bluetooth connection) from a computing device (e.g., a TV, a laptop, etc.) to the hearing device. This is because the noise is in the audio signal transmitted to the hearing device such that beamforming algorithms are not useful in suppressing the noise. As a result, a user of a hearing device may have difficulty understanding certain types of sound such as speech in the audio content transmitted to the hearing device.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Computing devices and methods for processing audio content for transmission to a hearing device are described herein. As will be described in more detail below, an exemplary computing device may comprise a memory storing instructions and a processor communicatively coupled to the memory and configured to execute the instructions to perform a process. The process may comprise identifying a hearing profile of a user of a hearing device, providing audio content as an input to a machine learning model, generating modified audio content by adjusting a characteristic of the audio content based on an output of the machine learning model and the hearing profile of the user of the hearing device, and transmitting the modified audio content to the hearing device.

By using computing devices and methods such as those described herein, it may be possible to facilitate a user of a hearing device more easily perceiving audio content transmitted to the hearing device by way of a computing device. For example, computing devices such as those described herein may be configured to adjust (e.g., attenuate or suppress) certain portions (e.g., background noise portions) of the audio content such that other portions (e.g., speech portions) of the audio content will be more easily perceived by a user of a hearing device. In so doing, computing devices and methods such as those described herein may provide a user of a hearing device with an improved hearing experience in relation to audio content transmitted from a computing device to the hearing device. Other benefits of the systems and methods described herein will be made apparent herein.

Figure 1:
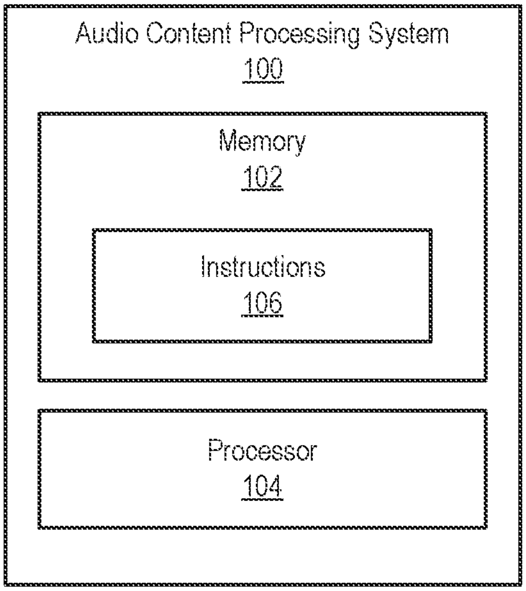
FIG. 1 illustrates an exemplary audio content processing system that may be implemented according to principles described herein.

FIG. 1 illustrates an exemplary audio content processing system 100 ("system 100") that may be implemented according to principles described herein. As shown, system 100 may include, without limitation, a memory 102 and a processor 104 selectively and communicatively coupled to one another. Memory 102 and processor 104 may each include or be implemented by hardware and/or software components (e.g., processors, memories, communication interfaces, instructions stored in memory for execution by the processors, etc.). In some examples, memory 102 and/or processor 104 may be implemented by any suitable computing device such as described herein. In other examples, memory 102 and/or processor 104 may be distributed between multiple devices and/or multiple locations as may serve a particular implementation. Illustrative implementations of system 100 are described herein.

Memory 102 may maintain (e.g., store) executable data used by processor 104 to perform any of the operations described herein. For example, memory 102 may store instructions 106 that may be executed by processor 104 to perform any of the operations described herein. Instructions 106 may be implemented by any suitable application, software, code, and/or other executable data instance.

Memory 102 may also maintain any data received, generated, managed, used, and/or transmitted by processor 104. Memory 102 may store any other suitable data as may serve a particular implementation. For example, memory 102 may store hearing profile data, user preference data, setting data, machine learning data, notification information, graphical user interface content, and/or any other suitable data.

Processor 104 may be configured to perform (e.g., execute instructions 106 stored in memory 102 to perform)

various processing operations associated with processing audio content. For example, processor 104 may perform one or more operations described herein to generate modified audio content by adjusting a characteristic of the audio content based on an output of a machine learning model and a hearing profile of the user of the hearing device. These and other operations that may be performed by processor 104 are described herein.

As used herein, a "hearing device" may be implemented by any device or combination of devices configured to provide or enhance hearing to a user. For example, a hearing device may be implemented by a hearing aid configured to amplify audio content to a recipient, a sound processor included in a cochlear implant system configured to apply electrical stimulation representative of audio content to a recipient, a sound processor included in a stimulation system configured to apply electrical and acoustic stimulation to a recipient, or any other suitable hearing prosthesis. In some examples, a hearing device may be implemented by a behind-the-ear ("BTE") housing configured to be worn behind an ear of a user. In some examples, a hearing device may be implemented by an in-the-ear ("ITE") component configured to at least partially be inserted within an ear canal of a user. In some examples, a hearing device may include a combination of an ITE component, a BTE housing, and/or any other suitable component.

In certain examples, hearing devices such as those described herein may be implemented as part of a binaural hearing system. Such a binaural hearing system may include a first hearing device associated with a first ear of a user and a second hearing device associated with a second ear of a user. In such examples, the hearing devices may each be implemented by any type of hearing device configured to provide or enhance hearing to a user of a binaural hearing system. In some examples, the hearing devices in a binaural system may be of the same type. For example, the hearing devices may each be hearing aid devices. In certain alternative examples, the hearing devices may be of a different type. For example, a first hearing device may be a hearing aid and a second hearing device may be a sound processor included in a cochlear implant system.

In some examples, a hearing device may additionally or alternatively include earbuds, headphones, hearables (e.g., smart headphones), and/or any other suitable device that may be used to facilitate a user experiencing audio content transmitted from a computing device. In such examples, the user may correspond to either a hearing impaired user or a non-hearing impaired user.

Figure 2:
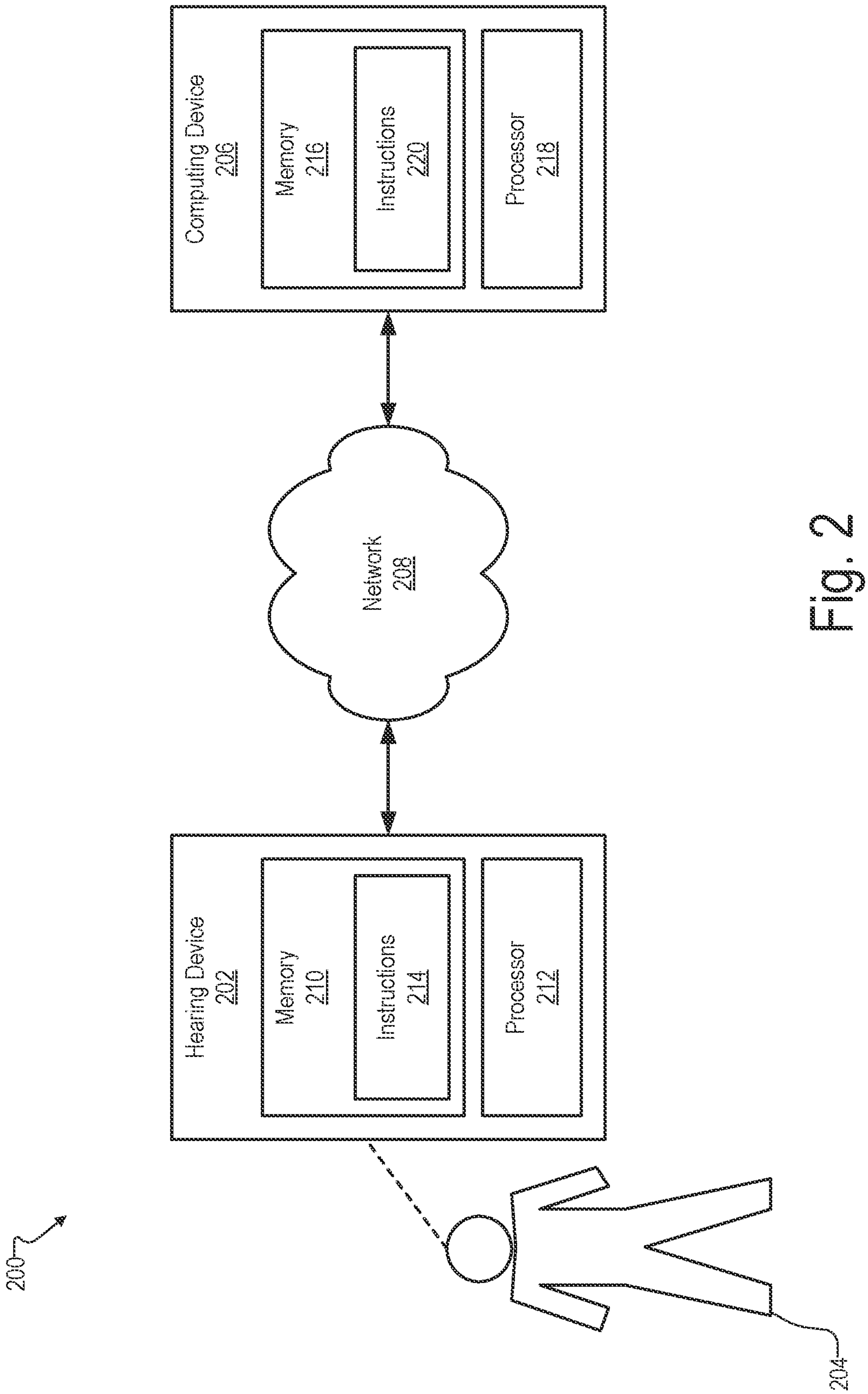
FIG. 2 illustrates an exemplary implementation of the audio content processing system of FIG. 1 according to principles described herein.

System 100 may be implemented in any suitable manner. For example, system 100 may be implemented by a computing device that is configured to transmit audio content in any suitable manner to a hearing device of a user. To illustrate an example, FIG. 2 shows an exemplary implementation 200 in which system 100 may be provided in certain implementations. As shown in FIG. 2, implementation 200 includes a hearing device 202 that is associated with a user 204 and that is communicatively coupled to a computing device 206 by way of a network 208.

Hearing device 202 may correspond to any suitable type of hearing device such as described herein. Hearing device 202 may include, without limitation, a memory 210 and a processor 212 selectively and communicatively coupled to one another. Memory 210 and processor 212 may each include or be implemented by hardware and/or software components (e.g., processors, memories, communication interfaces, instructions stored in memory for execution by the processors, etc.). In some examples, memory 210 and processor 212 may be housed within or form part of a BTE housing. In some examples, memory 210 and processor 212 may be located separately from a BTE housing (e.g., in an ITE component). In some alternative examples, memory 210 and processor 212 may be distributed between multiple devices (e.g., multiple hearing devices in a binaural hearing system) and/or multiple locations as may serve a particular implementation.

Memory 210 may maintain (e.g., store) executable data used by processor 212 to perform any of the operations associated with hearing device 202. For example, memory 210 may store instructions 214 that may be executed by processor 212 to perform any of the operations associated with hearing device 202 assisting a user in hearing. Instructions 214 may be implemented by any suitable application, software, code, and/or other executable data instance.

Memory 210 may also maintain any data received, generated, managed, used, and/or transmitted by processor 212. For example, memory 210 may maintain any suitable data associated with a hearing profile of a user and/or hearing device function data. Memory 210 may maintain additional or alternative data in other implementations.

Processor 212 is configured to perform any suitable processing operation that may be associated with hearing device 202. For example, when hearing device 202 is implemented by a hearing aid device, such processing operations may include monitoring ambient sound and/or representing sound to user 204 via an in-ear receiver. Processor 212 may be implemented by any suitable combination of hardware and software.

Computing device 206 may include or be implemented by any suitable type of computing device or combination of computing devices as may serve a particular implementation. For instance, computing device 206 may correspond to a TV, a standalone computing device (e.g., a TV transmitter) that is communicatively coupled to another computing device such as a TV, a sound bar that is communicatively coupled to another computing device such as a TV, a laptop computer, a desktop computer, a tablet computer, and/or any other suitable computing device or combination thereof that may be configured to transmit audio content to a hearing device.

Computing device 206 may include, without limitation, a memory 216 and a processor 218 selectively and communicatively coupled to one another. Memory 216 and processor 218 may each include or be implemented by hardware and/or software components (e.g., processors, memories, communication interfaces, instructions stored in memory for execution by the processors, etc.). To illustrate, memory 102 and processor 104 of system 100 may be implemented by memory 216 and processor 218 of computing device 202.

Memory 216 may maintain (e.g., store) executable data used by processor 218 to perform any of the operations associated with computing device 206. For example, memory 216 may store instructions 220 that may be executed by processor 218 to perform any of the operations associated with computing device 206 processing audio content such as described herein. Instructions 220 may be implemented by any suitable application, software, code, and/or other executable data instance.

Memory 216 may also maintain any data received, generated, managed, used, and/or transmitted by processor 218. For example, memory 216 may maintain any suitable data associated with a hearing profile of a user, machine learning algorithms, modified audio content, etc. Memory 216 may maintain additional or alternative data in other implementations.

Processor 218 is configured to perform any suitable processing operation that may be associated with computing device 206 and/or any suitable operation such as described herein. For example, when computing device 206 is implemented by a television, such processing operations may include processing an input signal for a multimedia program (e.g., a television program, a movie, a news program, etc.) for presentation to a user. Processor 218 may be implemented by any suitable combination of hardware and software. In certain examples, processor 218 may correspond to or otherwise include one or more deep neural network ("DNN") chips configured to perform any suitable machine learning operation such as described herein.

Network 208 may include, but is not limited to, one or more wireless networks (Wi-Fi networks), wireless communication networks, mobile telephone networks (e.g., cellular telephone networks), mobile phone data networks, broadband networks, narrowband networks, the Internet, local area networks, wide area networks, and any other networks capable of carrying data and/or communications signals between hearing device 202 and computing device 206. In certain examples, network 208 may be implemented by a Bluetooth protocol (e.g., Bluetooth Classic, Bluetooth Low Energy ("LE"), etc.) and/or any other suitable communication protocol to facilitate communications between hearing device 202 and computing device 206. Communications between hearing device 202, computing device 206, and any other device/system may be transported using any one of the above-listed networks, or any combination or sub-combination of the above-listed networks.

Computing device 206 may be configured to transmit audio content to hearing device 202 by way of network 208 or in any other suitable manner such as described herein. As used herein, "audio content" may refer to any type of audio content that may be transmitted by way of computing device 206 to hearing device 202. For example, audio content may correspond to multimedia content such as TV programs, news programs, movies, podcasts, webcasts, and/or any other suitable type of audio content. Audio content such as that described herein may have a signal to noise ratio that may make certain portions of the audio content difficult for user 204 to understand. For example, the signal to noise ratio between non-speech portions (e.g., background noises and/or other noises) in the audio content may make speech portions (e.g., dialogue portions) in the audio content difficult for user 204 to understand even with the use of hearing device 202. Accordingly, system 100 may be configured to perform one or more processing operations to improve the perceptibility of the audio content that will be transmitted by way of computing device 206 to hearing device 202.

Figure 3:
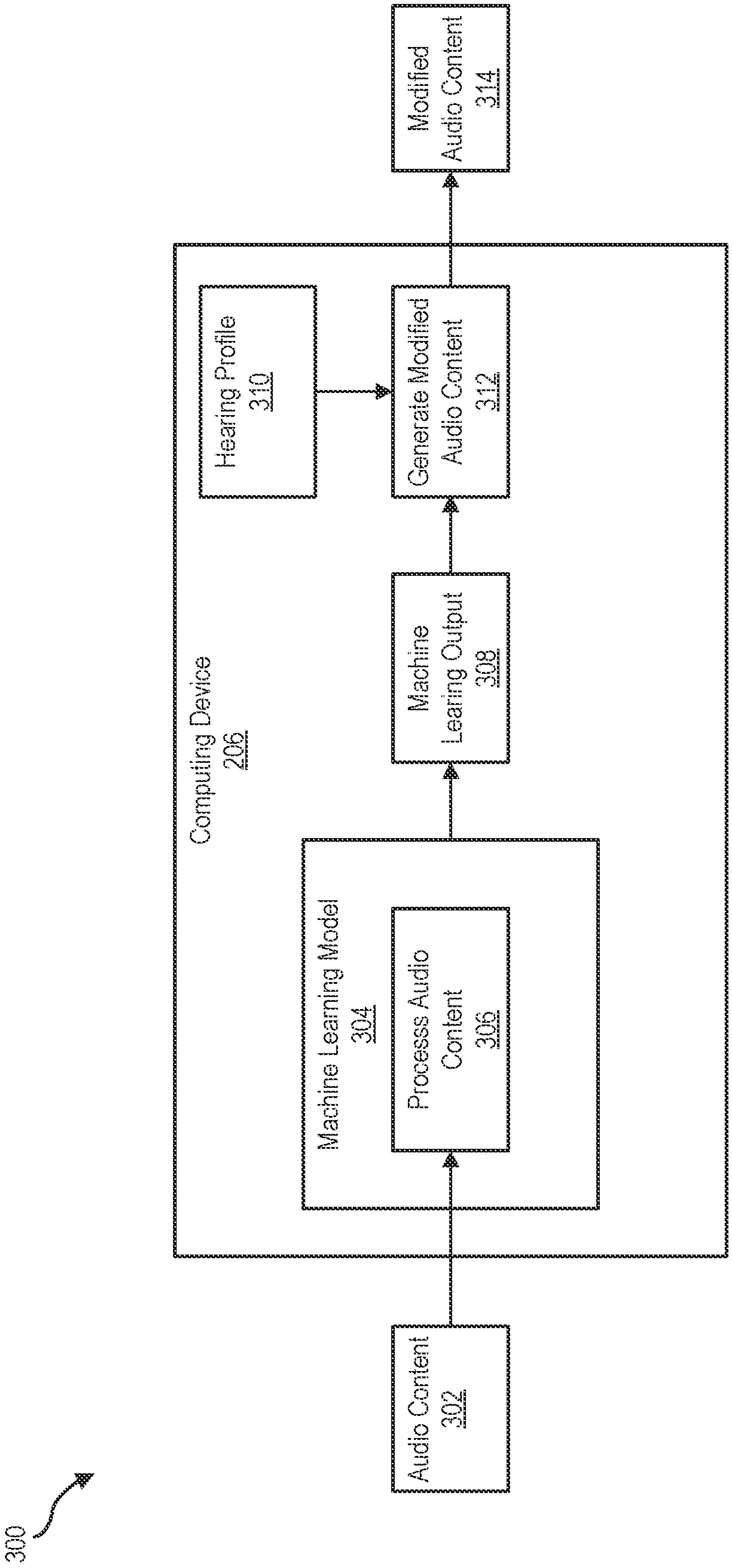
FIG. 3 illustrates an exemplary flow diagram that may be implemented according to principles described herein.

To illustrate, FIG. 3 shows an exemplary flow diagram 300 that depicts a flow of operations that may be performed by system 100 (e.g., processor 218 of computing device 206) to process audio content. As shown in FIG. 3, system 100 may provide audio content 302 as an input to a machine learning model 304 implemented by computing device 206. Machine learning model 304 may implement any suitable type of machine learning methodology as may serve a particular implementation. For example, in certain implementations, machine learning model 304 may implement a DNN, a convolutional network ("CNN"), a Kalman filter, a Markov model, and/or a Bayesian network to process audio content 302.

At operation 306, machine learning model 304 may process audio content 302. This may be accomplished in any suitable manner. For example, the processing of audio content 302 may include machine learning model 304 separating a first type of audio content included in audio content 302 from a second type of audio content included in audio content 302. To illustrate an example, the first type of audio content may correspond to background noise content included in audio content 302 and the second type of audio content may correspond to a speech content included in audio content 302. In such an example, machine learning model 304 may separate the background noise content from the speech content in audio content 302 so that they may be processed differently. Machine learning model 304 may separate and/or distinguish between different sounds or types of sounds in audio content 302 using any suitable algorithm. Exemplary algorithms that may be employed for such purposes are described in U.S. Patent Publication No. 2022/0093118 A1 and U.S. Patent Publication No. 2022/0095061 A1, the contents of which are hereby incorporated by reference in their entirety.

In certain examples, machine learning model 304 may be further configured to separate the first type of audio content into a third type of audio content and a fourth type of audio content. For example, in implementations where the first type of audio content corresponds to background noise content, the third type of audio content may correspond to environmental noises such as vehicle noises, explosions, etc. in audio content 302 and the fourth type of audio content may correspond to music included in audio content 302.

In certain examples, machine learning model 304 may be pre-trained based on additional audio content. For example, audio content 302 may correspond to multimedia content that is presented to user 204 of hearing device 202. In such examples, machine learning model 304 may be pre-trained based on additional multimedia content. To illustrate an example, audio content 302 may correspond to a TV program and machine learning model 304 may be pre-trained based on additional TV programs to improve performance of machine learning model 304 when applied to the TV program.

In certain examples, machine learning model 304 may be additionally or alternatively pre-trained based on user preferences with respect to audio content 302. For example, machine learning model 304 may be pre-trained based on preferences of user 204 and/or preferences of one or more additional users with respect to audio content 302 and/or additional audio content.

In certain examples, the processing performed by machine learning model 304 may change depending on a scene type and/or a program type of audio content 302. Accordingly, in certain examples, machine learning model 304 may be configured to determine at least one of a scene type or a program type of audio content 302 at any given point in time during presentation of audio content 302. For example, machine learning model 304 may analyze audio content 302 in any suitable manner and determine that audio content includes a first scene corresponding to an action scene (e.g., a scene with significant background noises), a second scene corresponding to a scene with dialogue (e.g., a scene at a restaurant), and a third scene corresponding to a scene with background music. Machine learning model 304 may process audio content 302 differently depending on the type of scene represented in audio content 302 at any given time during presentation of audio content 302.

Based on the processing performed at operation 306, machine learning model 304 is configured to provide a machine learning output 308. Machine learning output 308 may include any suitable information associated with audio content 302 that may facilitate system 100 processing audio content 302 to improve perceptibility of audio content 302.

At operation 310, system 100 may identify a hearing profile of user 204 of hearing device 202. The hearing profile may include any suitable information associated with hearing capabilities of user 204, fitting parameters used to fit hearing device 202 to user 204, current settings of hearing device 202, and/or hearing preferences of user 204. For example, a hearing profile may include information associated with a hearing impairment type of user 204, an amount of hearing impairment of user 204, and/or any other suitable information. System 100 may identify the hearing profile in any suitable manner. For example, system 100 may communicate in any suitable manner with hearing device 202 to access the hearing profile of user 204 from memory 210. Additionally or alternatively, in certain examples, the hearing profile of user 204 may be stored in memory 216 of computing device 206 and/or at any other suitable location.

At operation 312, system 100 may generate modified audio content by adjusting a characteristic of audio content 302 based on machine learning output 308 and the hearing profile of user 204 of hearing device 202. The characteristic of the audio content may include any suitable characteristic as may serve a particular implementation. For example, the characteristic may include a frequency of audio content 302, an amplitude of audio content 302, an attenuation level of audio content 302, and/or any other suitable characteristic. System 100 may adjust the characteristic in any suitable manner. For example, in implementations where audio content 302 includes a first type of audio content and a second type of audio content, the adjusting of audio content 302 may include adjusting a characteristic of the first type of audio content to improve perceptibility of the second type of audio content. For example, the adjusting of the first type of audio content may include attenuating the first type of audio content and/or amplifying the second type of audio content. To illustrate, if the first type of audio content corresponds to traffic noises in audio content 302 and the second type of audio content corresponds to spoken dialogue, the adjusting of the characteristic may include system 100 attenuating the traffic noises and/or amplifying the spoken dialogue to facilitate user 204 more easily perceiving the spoken dialogue.

In examples where the first type of audio content includes a third type of audio content and a fourth type of audio content, the adjusting of the characteristic may include adjusting a characteristic of the third type of audio content in a first manner and adjusting a characteristic of the fourth type of audio content in a second manner that is different than the first manner. To illustrate, the third type of audio content may correspond to special effects noises that system 100 may attenuate or completely suppress because they may make understanding speech in audio content 302 difficult to understand. The fourth type of audio content may correspond to music that may be considered as useful background noise. As such, system 100 may either attenuate the music less than the special effects or may not attenuate the music at all. In so doing, system 100 may be configured to maintain a desired atmosphere/mood/vibe/sentiment associated with audio content 302 while still improving a user's perception of the speech included in audio content 302.

In certain examples, an amount that a characteristic of audio content 302 is adjusted may be adjustable based on user input. Such user input may be received in any suitable manner. For example, system 100 may receive a user input through any suitable user interface associated with hearing device 202 and/or computing device 206. Based on the user input, system 100 may modify the amount that the characteristic is adjusted. For example, system 100 may either increase or decrease an amount of attenuation that may be applied to background noise included in audio content 302. Additionally or alternatively, based on the user input, system 100 may either increase or decrease an amount of amplification applied to speech content included in audio content 302.

In certain examples, the amount that a characteristic of audio content 302 may be adjusted may depend based on one or more user preferences. For example, an amount of attenuation may depend on a user preference of more noise attenuation versus less artifacts. Additionally or alternatively, an amount of attenuation may depend on a user preference of more noise attenuation versus less latency.

In certain examples, system 100 may automatically adjust the amount that a characteristic of audio content 302 is adjusted. As used herein, the expression "automatically" means that an operation (e.g., adjusting a characteristic of audio content) or series of operations are performed without requiring further input from a user. For example, system 100 may track usage patterns of a user while the user experiences audio content transmitted by a computing device. Based on such information, system 100 may automatically adjust an amount that a characteristic of audio content 302 is adjusted, without requiring that the user provide further input. To illustrate an example, if user 204 typically reduces the volume during commercials presented with a TV program, system 100 may automatically reduce the volume of audio content 302 during future commercial breaks. Additionally or alternatively, if user 204 typically increases the volume of audio content during action scenes that include significant background noises and speech content, system 100 may automatically attenuate the background noises and/or automatically amplify the speech content during such action scenes.

At operation 314, the modified audio content may be transmitted to hearing device 202 in any suitable manner. For example, in certain implementations, hearing device 202 and computing device 206 may communicatively coupled together by way of a wireless connection (e.g., through network 208). In such examples, the transmitting of the modified content to hearing device 202 at operation 314 may include transmitting the modified audio content by way of the wireless connection.

In certain alternative examples, computing device 206 and hearing device 202 may be communicatively coupled by way of a wired connection. In such examples, the transmitting of the modified content to hearing device 202 at operation 314 may include transmitting the modified audio content by way of the wired connection.

In certain additional or alternative examples, the transmitting of the modified audio content to hearing device may include acoustically transmitting the modified audio content to hearing device 202. In such examples, computing device 206 may include one or more speakers configured to produce sound waves that may be received by a microphone of hearing device 202. In such examples, the transmitting of the modified audio content to hearing device 202 may include acoustically transmitting the audio content to hearing device 202 by way of the speaker.

Figure 4:
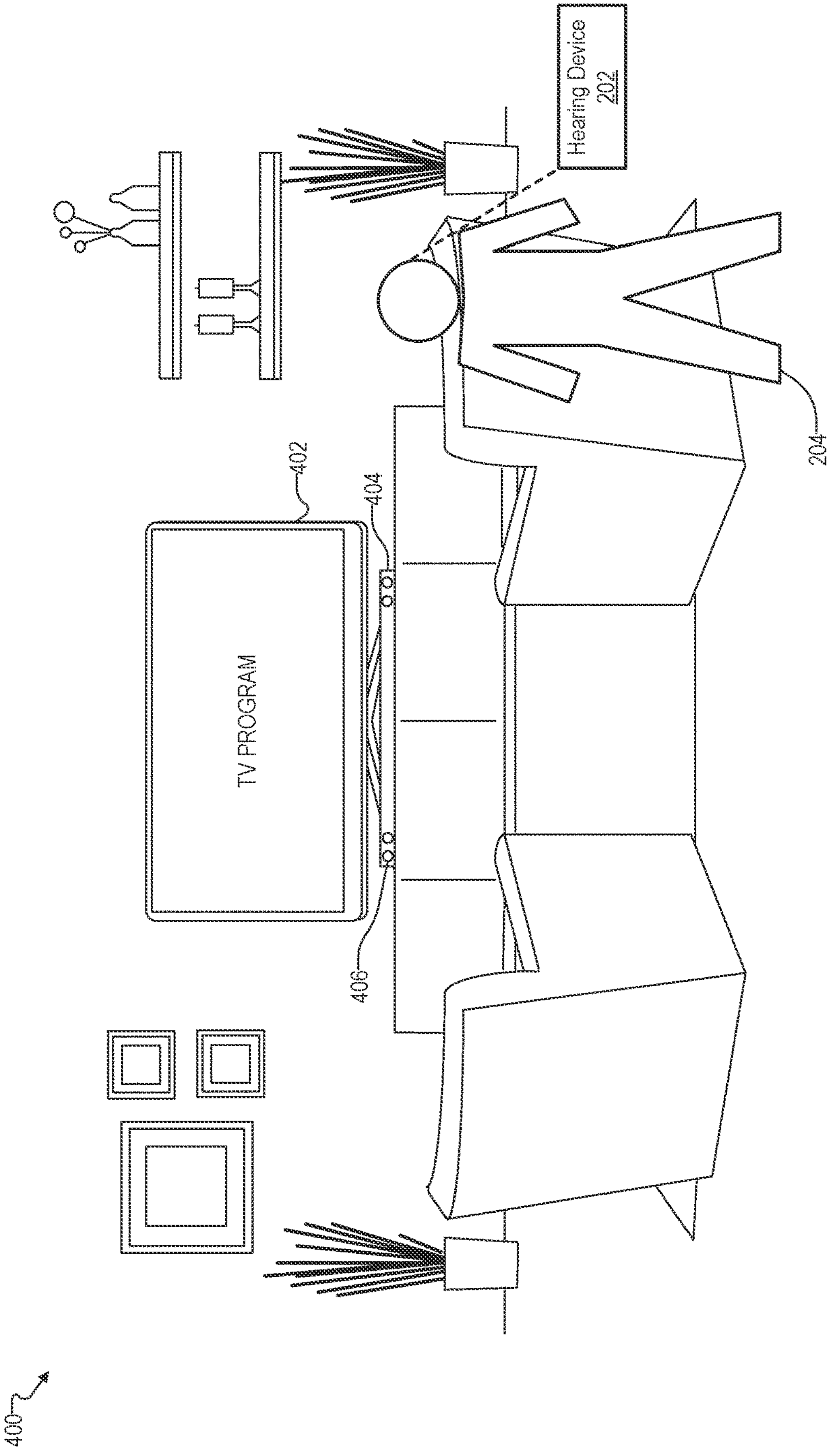
FIG. 4 illustrates an exemplary environment in which a computing device may be implemented according to principles described herein.

To illustrate an example, FIG. 4 shows an exemplary configuration 400 in which system 100 may be implemented in certain examples. As shown in FIG. 4, user 204 of hearing device 202 is in a TV room where a TV 402 is playing a TV program. A sound bar 404 is communicatively coupled to TV 402 and includes speakers 406 configured to acoustically provide audio content within the TV room. In the example shown in FIG. 4, TV 402 and/or sound bar 404 may correspond to computing device 206. The modified audio content associated with the TV program displayed by TV 402 may be transmitted to hearing device 202 acoustically by way of speakers 406 and/or wirelessly (e.g., by way of network 208).

In certain examples, system 100 may process audio content 302 differently for different users located within a vicinity of computing device 206. In such examples, system 100 may identify an additional hearing profile of an additional user of an additional hearing device. This may be accomplished in any suitable manner such as described herein. System 100 may generate, based on an output of machine learning model 304 and the additional hearing profile, additional modified audio content by adjusting an additional characteristic of audio content 302.

Figure 5:
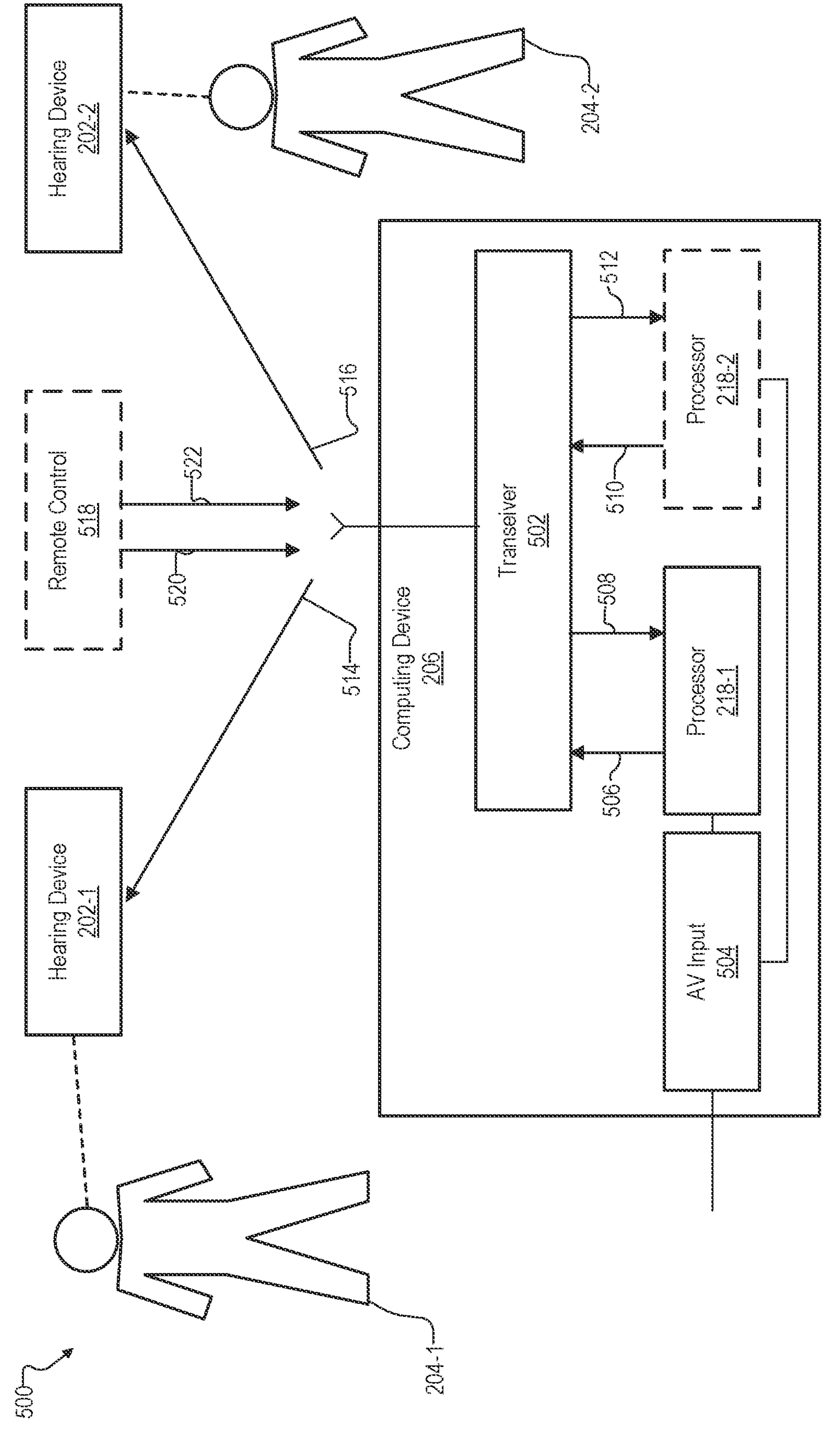
FIGS. 5-6 illustrate additional exemplary implementations of the audio content processing system of FIG. 1 according to principles described herein.

System 100 may transmit the additional modified audio content to the additional hearing device simultaneously with the transmitting of the modified audio content to hearing device 202. This may be accomplished in any suitable manner. To illustrate, FIG. 5 shows an exemplary configuration 500 in which system 100 may be implemented to concurrently transmit modified audio content to users 204-1 and 204-2. As shown in FIG. 5, user 204-1 is associated with hearing device 202-1 and user 204-2 is associated with hearing device 202-2. In certain examples, each of users 204-1 and 204-2 may correspond to hearing impaired users. In such examples, hearing device 202-1 and hearing device 202-2 may each correspond to hearing aid type devices such as any of those described herein. In certain alternative implementations, user 204-1 may correspond to a hearing impaired user and user 204-2 may correspond to a non-hearing impaired user. In such examples, hearing device 202-1 may correspond to a hearing aid type device and hearing device 202-2 may correspond to a hearable such as smart headphones. In certain alternative implementations, both user 204-1 and user 204-2 may correspond to non-hearing impaired users. In such examples, hearing device 202-1 and hearing device 202-2 may each correspond to hearables such as smart headphones.

Although FIG. 5 only shows two users of hearing devices 202, it is understood that system 100 may be configured to concurrently provide modified audio content to any suitable number of users as may serve a particular implementation.

In the example shown in FIG. 5, computing device 206 includes a single transceiver 502 and an audio video ("AV") input 504 (e.g., from a TV) configured to provide audio content to a processor 218-1. In certain examples, processor 218-1 may process audio content for both user 204-1 and user 204-2. Alternatively, processor 218-1 may be configured to process the audio content specifically for user 204-1 and a second processor 218-2 may process the audio content specifically for user 204-2. In certain examples, processor 218-1 and processor 218-2 may each correspond to or otherwise include a dedicated DNN chip configured to perform machine learning operations such as described herein.

Processor 218-1 may be configured to provide a first modified audio signal 506 to transceiver 502 and receive a first control signal 508 from transceiver 502. Processor 218-2 may be configured to provide a second modified audio signal 510 to transceiver 402 and receive a second control signal 512 from transceiver 502.

Transceiver 502 may establish a first wireless connection 514 between hearing device 202-1 and computing device 206 and a second wireless connection between hearing device 202-2 and computing device 206. First wireless connection 514 and second wireless connection 516 may correspond to any suitable type of wireless connection as may serve a particular implementation. In certain examples, first wireless connection 514 and second wireless connection 516 may correspond to Bluetooth LE wireless connections through which audio content may be streamed to hearing devices 202-1 and 202-2.

Transceiver 502 is configured to concurrently transmit (e.g., stream) audio content to hearing devices 202-1 and 202-1 by way of first wireless connection 514 and second wireless connection 516. The audio content transmitted by way of first wireless connection 514 may be signal processed by system 100 (e.g., processor 218-1) according to the needs and/or preferences of user 204-1 (e.g., denoising strength, gain shape according to the hearing loss/difficulty of user 204-1, etc.). Similarly, the audio content transmitted by way of second wireless connection 516 may be signal processed by system 100 (e.g., processor 218-2) according to the needs and/or preferences of user 204-2.

As shown in FIG. 5, in certain examples, a remote control 518 may be provided to facilitate user 204-1 and/or user 204-2 controlling computing device 206 and the modified audio content that is transmitted to hearing devices 202-1 and 202-2. Remote control 518 may be implemented in any suitable manner. For example, remote control 518 may correspond to a dedicated remote (e.g., a TV remote), a mobile application operating on a smartphone, or any other suitable type of remote control device. Remote control 518 may be configured to transmit a first control signal 520 and a second control signal 522 to transceiver 502. First control signal 520 may be configured to control any suitable process associated with the modified audio content transmitted to hearing device 202-1. Second control signal 522 may be configured to control any suitable process associated with the modified audio content transmitted to hearing device 202-2.

Figure 6:
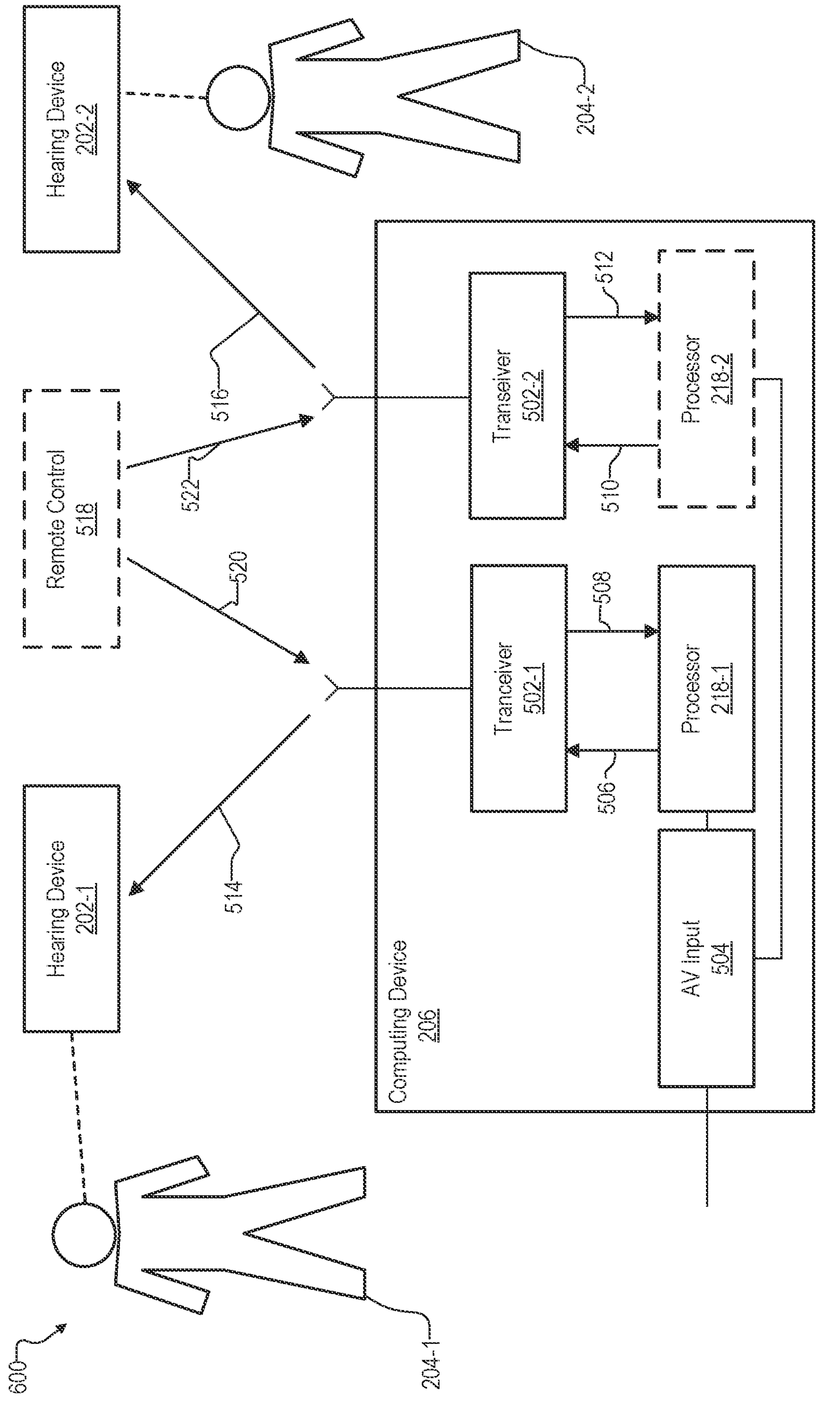

In certain examples, computing device 206 may include multiple transceivers that are each configured to transmit modified audio content to a different hearing device associated with a different user. To illustrate, FIG. 6 shows an additional configuration 600 that is similar to configuration 500 shown in FIG. 5 except that computing device 206 includes a first transceiver 502-1 and a second transceiver 502-2. First transceiver 502-1 may be configured to establish a first wireless connection 514 between hearing device 202-1 and computing device 206 and second transceiver 502-2 may be configured to establish a second wireless connection 516 between the hearing device 202-2 and computing device 206. In the example shown in FIG. 6, wireless connections 514 and 516 may be implemented using any suitable wireless communication protocol. For example, wireless connections 514 and 516 may be implemented by a Bluetooth Classic protocol in certain examples.

Figure 7:
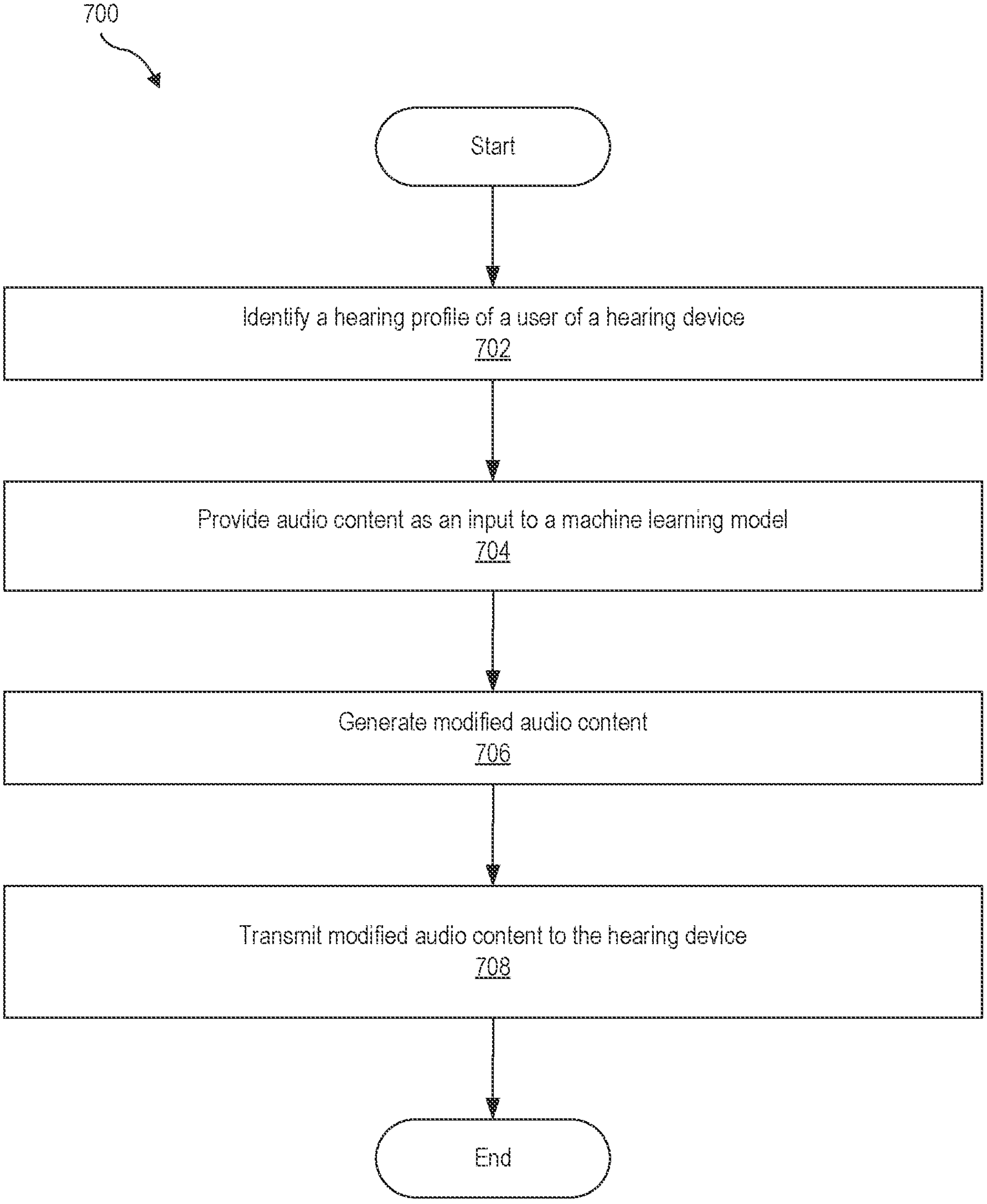
FIG. 7 illustrates an exemplary method according to principles described herein.

FIG. 7 illustrates an exemplary method 700 for processing audio content for transmission to a hearing device according to principles described herein. While FIG. 7 illustrates exemplary operations according to one embodiment, other embodiments may omit, add to, reorder, and/or modify any of the operations shown in FIG. 7. One or more of the operations shown in FIG. 7 may be performed by a computing device such as computing device 206, an additional computing device communicatively coupled to computing device 206, any components included therein, and/or any combination or implementation thereof.

At operation 702, an audio content processing system such as audio content processing system 100 may identify a hearing profile of a user of a hearing device. Operation 702 may be performed in any of the ways described herein.

At operation 704, the audio content processing system may provide audio content as an input to a machine learning model. Operation 704 may be performed in any of the ways described herein.

At operation 706, the audio content processing system may generate modified audio content by adjusting a characteristic of the audio content based on an output of the machine learning model and the hearing profile of the user of the hearing device. Operation 706 may be performed in any of the ways described herein.

At operation 708, the audio content processing system may transmit the modified audio content to the hearing device. Operation 708 may be performed in any of the ways described herein.

In some examples, a computer program product embodied in a non-transitory computer-readable storage medium may be provided. In such examples, the non-transitory computer-readable storage medium may store computer-readable instructions in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g., a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 8:
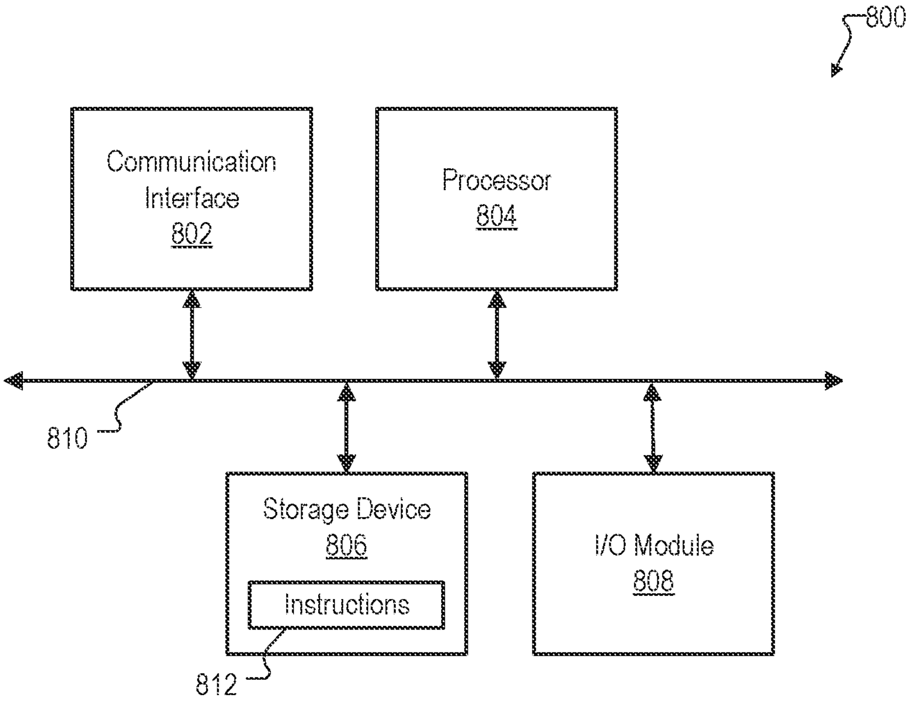
FIG. 8 illustrates an exemplary computing device according to principles described herein.

FIG. 8 illustrates an exemplary computing device 800 that may be specifically configured to perform one or more of the processes described herein. As shown in FIG. 8, computing device 800 may include a communication interface 802, a processor 804, a storage device 806, and an input/output ("I/O") module 808 communicatively connected one to another via a communication infrastructure 810. While an exemplary computing device 800 is shown in FIG. 8, the components illustrated in FIG. 8 are not intended to be limiting. Additional or alternative components may be used in other embodiments. Components of computing device 800 shown in FIG. 8 will now be described in additional detail.

Communication interface 802 may be configured to communicate with one or more computing devices. Examples of communication interface 802 include, without limitation, a wired network interface (such as a network interface card), a wireless network interface (such as a wireless network interface card), a modem, an audio/video connection, and any other suitable interface.

Processor 804 generally represents any type or form of processing unit capable of processing data and/or interpreting, executing, and/or directing execution of one or more of the instructions, processes, and/or operations described herein. Processor 804 may perform operations by executing computer-executable instructions 812 (e.g., an application, software, code, and/or other executable data instance) stored in storage device 806.

Storage device 806 may include one or more data storage media, devices, or configurations and may employ any type, form, and combination of data storage media and/or device. For example, storage device 806 may include, but is not limited to, any combination of the non-volatile media and/or volatile media described herein. Electronic data, including data described herein, may be temporarily and/or permanently stored in storage device 806. For example, data representative of computer-executable instructions 812 configured to direct processor 804 to perform any of the operations described herein may be stored within storage device 806. In some examples, data may be arranged in one or more databases residing within storage device 806.

I/O module 808 may include one or more I/O modules configured to receive user input and provide user output. I/O module 808 may include any hardware, firmware, software, or combination thereof supportive of input and output capabilities. For example, I/O module 808 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 808 is configured to provide graphical data to a display for presentation to a user. The graphical data may be representative of one or more graphical user interfaces and/or any other graphical content as may serve a particular implementation.

In some examples, any of the systems, hearing devices, computing devices, and/or other components described herein may be implemented by computing device 800. For example, memory 102, memory 210, and/or memory 216 may be implemented by storage device 806, and processor 104, processor 212, and/or processor 218 may be implemented by processor 804.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A computing device comprising:

a memory storing instructions; and a processor communicatively coupled to the memory and configured to execute the instructions to perform a process comprising:

identifying a hearing profile of a user of a hearing device;

providing audio content as an input to a machine learning model;

generating modified audio content by adjusting a characteristic of the audio content based on an output of the machine learning model and the hearing profile of the user of the hearing device; and transmitting the modified audio content to the hearing device, wherein:

the machine learning model is configured to separate a first type of audio content included in the audio content from a second type of audio content included in the audio content; and the adjusting of the characteristic of the audio content includes adjusting a characteristic of the first type of audio content to improve perceptibility of the second type of audio content.

2. The computing device of claim 1, wherein the adjusting of the characteristic of the first type of audio content includes attenuating the first type of audio content included in the audio content.

3. The computing device of claim 1, wherein the first type of audio content corresponds to background noise content and the second type of audio content corresponds to speech content.

4. The computing device of claim 1, wherein:

the machine learning model is further configured to separate the first type of audio content into a third type of audio content and a fourth type of audio content; and the adjusting of the characteristic of the first type of audio content includes adjusting a characteristic of the third type of audio content in a first manner and adjusting a characteristic of the fourth type of audio content in a second manner that is different than the first manner.

5. The computing device of claim 1, wherein:

the machine learning model is configured to determine at least one of a scene type or a program type of the audio content; and the adjusting of the characteristic of the audio content includes adjusting the characteristic based on the at least one of the scene type or the program type of the audio content.

6. The computing device of claim 1, wherein:

the audio content is included in multimedia content that is presented to the user of the hearing device; and the machine learning model is pre-trained based on additional multimedia content.

7. The computing device of claim 1, wherein the machine learning model is pre-trained based on preferences of one or more additional users with respect to at least one of the audio content or additional audio content.

8. The computing device of claim 1, wherein an amount that the characteristic of the audio content is adjusted based on user input.

9. The computing device of claim 1, wherein:

the computing device and the hearing device are communicatively coupled together by way of a wireless connection; and the transmitting of the modified audio content to the hearing device includes transmitting the modified audio content by way of the wireless connection.

10. The computing device of claim 1, wherein the process further comprises:

identifying an additional hearing profile of an additional user of an additional hearing device;

generating additional modified audio content by adjusting an additional characteristic of the audio content based on the output of the machine learning model and the additional hearing profile of the additional user; and transmitting the additional modified audio content to the additional hearing device simultaneously with the transmitting the modified audio content to the hearing device.

11. The computing device of claim 10, wherein:

the computing device further comprises a single transceiver configured to establish a first wireless connection between the hearing device and the computing device and a second wireless connection between the additional hearing device and the computing device; and the transmitting includes:

transmitting the modified audio content to the hearing device by way of the first wireless connection; and transmitting the additional modified audio content to the additional hearing device by way of the second wireless connection.

12. The computing device of claim 10, wherein:

the computing device further comprises:

a first transceiver configured to establish a first wireless connection between the hearing device and the computing device; and a second transceiver configured to establish a second wireless connection between the additional hearing device and the computing device; and the transmitting includes:

transmitting the modified audio content to the hearing device by way of the first wireless connection; and transmitting the additional modified audio content to the additional hearing device by way of the second wireless connection.

13. The computing device of claim 1, wherein:

the computing device further includes a speaker; and the transmitting of the modified audio content to the hearing device includes acoustically transmitting the audio content to the hearing device by way of the speaker.

14. A computer program product embodied in a non-transitory computer readable storage medium and comprising computer instructions for:

identifying a hearing profile of a user of a hearing device;

providing audio content as an input to a machine learning model;

generating modified audio content by adjusting a characteristic of the audio content based on an output of the machine learning model and the hearing profile of the user of the hearing device; and transmitting the modified audio content to the hearing device, wherein:

the machine learning model is configured to separate a first type of audio content included in the audio content from a second type of audio content included in the audio content; and the adjusting of the characteristic of the audio content includes adjusting a characteristic of the first type of audio content to improve perceptibility of the second type of audio content.

15. The computer program product of claim 14, wherein:

the machine learning model is further configured to separate the first type of audio content into a third type of audio content and a fourth type of audio content; and the adjusting of the characteristic of the first type of audio content includes adjusting a characteristic of the third type of audio content in a first manner and adjusting a characteristic of the fourth type of audio content in a second manner that is different than the first manner.

16. A method comprising:

identifying, by an audio content processing system, a hearing profile of a user of a hearing device;

providing, by the audio content processing system, audio content as an input to a machine learning model;

generating, by the audio content processing system, modified audio content by adjusting a characteristic of the audio content based on an output of the machine learning model and the hearing profile of the user of the hearing device; and transmitting, by the audio content processing system, the modified audio content to the hearing device, wherein:

the machine learning model is configured to separate a first type of audio content included in the audio content from a second type of audio content included in the audio content; and the adjusting of the characteristic of the audio content includes adjusting a characteristic of the first type of audio content to improve perceptibility of the second type of audio content.

17. The method of claim 16, wherein:

the machine learning model is further configured to separate the first type of audio content into a third type of audio content and a fourth type of audio content; and the adjusting of the characteristic of the first type of audio content includes adjusting a characteristic of the third type of audio content in a first manner and adjusting a characteristic of the fourth type of audio content in a second manner that is different than the first manner.

* * * * *